(12) United States Patent
Eller et al.

(10) Patent No.: US 9,233,753 B2
(45) Date of Patent: Jan. 12, 2016

(54) HELICOPTER ROTOR LOAD REDUCTION AND TIP CLEARANCE CONTROL

(71) Applicant: Sikorsky Aircraft Corporation, Stratford, CT (US)

(72) Inventors: Erez Eller, Oakville, CT (US); John Knag, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 187 days.

(21) Appl. No.: 13/949,726

(22) Filed: Jul. 24, 2013

(65) Prior Publication Data

US 2015/0028152 A1 Jan. 29, 2015

(51) Int. Cl.
*B64C 27/57* (2006.01)
*B64C 27/00* (2006.01)
*B64C 27/10* (2006.01)
*B64C 27/72* (2006.01)

(52) U.S. Cl.
CPC .............. *B64C 27/001* (2013.01); *B64C 27/008* (2013.01); *B64C 27/10* (2013.01); *B64C 2027/002* (2013.01); *B64C 2027/7238* (2013.01)

(58) Field of Classification Search
CPC ............ B64C 27/001; B64C 2027/002; B64C 2027/003; B64C 2027/004; B64C 2027/005
See application file for complete search history.

(56) References Cited

U.S. PATENT DOCUMENTS

| | | | |
|---|---|---|---|
| 3,690,607 A | 9/1972 | Mard | |
| 4,008,979 A | 2/1977 | Cooper et al. | |
| 4,519,743 A * | 5/1985 | Ham | B64C 27/72 244/17.13 |
| 4,894,787 A | 1/1990 | Flannelly et al. | |
| 4,946,354 A | 8/1990 | Aubry et al. | |
| 4,953,098 A | 8/1990 | Fischer, Jr. et al. | |
| 5,197,010 A | 3/1993 | Andersson | |
| 5,655,878 A | 8/1997 | Yamakawa et al. | |
| 7,210,651 B2 | 5/2007 | Scott | |
| 7,648,338 B1 | 1/2010 | Welsh | |
| 7,674,091 B2 | 3/2010 | Zierten | |
| 7,762,770 B2 | 7/2010 | Sun et al. | |
| 8,197,205 B2 | 6/2012 | Rudley et al. | |
| 8,201,771 B2 * | 6/2012 | Kessler et al. | 244/17.13 |
| 8,235,667 B2 | 8/2012 | Waide et al. | |
| 2007/0131820 A1 | 6/2007 | Chaudhry et al. | |
| 2012/0181379 A1 | 7/2012 | Eller et al. | |

OTHER PUBLICATIONS

International Search Report for application PCT/US14/46155, dated Mar. 13, 2015, 8 pages.
Written Opinion for application PCT/US14/46155, dated Mar. 13, 2015, 4 pages.

* cited by examiner

*Primary Examiner* — Brian M O'Hara
(74) *Attorney, Agent, or Firm* — Cantor Colburn LLP

(57) ABSTRACT

A method of controlling a helicopter having a rotor with blades is provided. The method includes receiving, by a computing device comprising a processor, at least one input associated with the helicopter; generating, by the computing device, control signals configured to counteract blade bending associated with the rotors based on the received at least one input; measuring, by the computing device, blade signals using sensors for the blades; extracting, by the computing device, harmonic loads from the measured blade signals; adapting, by the computing device, the control signals based on the harmonic loads; and controlling, by the computing device, servos connected to the blades to adjust the blades according to the adapted control signals to reduce vibratory loads on the blades.

18 Claims, 5 Drawing Sheets

HELICOPTER ROTOR LOAD REDUCTION AND TIP CLEARANCE CONTROL

BACKGROUND

Total vehicle height is an important design parameter for fitting on existing ship hangers and elevators, as well as fitting inside transport aircraft. As shown in FIGS. 1 and 2A-2B, conventional coaxial helicopters are typically taller than other helicopters of similar performance due to the existence of an additional rotor and the flapping motion of the rotor blades necessitating a minimum vertical hub spacing (rotor separation ratio). In particular, FIG. 1 shows an upper rotor 102 coupled to an upper rotor swashplate 104 and a lower rotor 106 coupled to a lower rotor swashplate 108. A rotor hub separation 110 may generally separate the upper rotor 102 and lower rotor 106. FIG. 2A illustrates a single axis/rotor helicopter 202, whereas FIG. 2B illustrates a coaxial/dual rotor helicopter 204. As shown in FIGS. 2A-2B, the height of the helicopter 204 may be appreciably greater than the height of the helicopter 202.

Some helicopters, such as the Sikorsky X2 Technology™ Demonstrator, may have a reduced rotor separation ratio relative to other helicopters. The reduced rotor separation ratio may be facilitated by the use of hingeless, rigid rotors which may bend rather than flap like articulated rotors do. The high blade rigidity may imply large blade moments and approximately 20% 2/rev blade bending that may increase vibratory (peak to peak) blade stresses beyond 1/rev loads alone. Though 2/rev blade bending may cancel at a hub, the 2/rev blade bending may: (1) decrease minimum blade tip clearance between the two rotors (e.g., rotors 102 and 106), (2) increase peak blade stresses, and (3) increase rotor blade and hub design weight. 2/rev blade control typically cannot be accomplished using an ordinary swashplate, at least for rotors with two blades or more than three blades. In some instances, it may be desirable to utilize a configuration that does not include a swashplate.

BRIEF SUMMARY

An embodiment is directed to a method of controlling a helicopter having a rotor with blades. The method includes receiving, by a computing device comprising a processor, at least one input associated with the helicopter; generating, by the computing device, control signals configured to counteract blade bending associated with the rotors based on the received at least one input; measuring, by the computing device, blade signals using sensors for the blades; extracting, by the computing device, harmonic loads from the measured blade signals; adapting, by the computing device, the control signals based on the harmonic loads; and controlling, by the computing device, servos connected to the blades to adjust the blades according to the adapted control signals to reduce vibratory loads on the blades.

Another embodiment is directed to an apparatus for use in a helicopter having at least one rotor with blades, the apparatus includes at least one processor and a memory having instructions stored thereon that, when executed by the at least one processor, cause the apparatus to receive, with the at least one processor, at least one input associated with the helicopter; generate, with the at least one processor, control signals configured to counteract blade bending associated with at least one rotor based on the received at least one input; measure, with the at least one processor, blade signals using sensors for the blades; extract, with the at least one processor, harmonic loads from the measured blade signals; adapt, with the at least one processor, the control signals based on the harmonic loads; and control, with the at least one processor, servos connected to the blades to adjust the blades according to the adapted control signals to reduce vibratory loads on the blades.

Another embodiment is directed to an aircraft having rotors, with each rotor having a plurality of blades. Each of the plurality of blades is associated with a sensor included in a plurality of sensors. The aircraft also includes a servo connected to at least one of the blades and a control computer. The control computer is configured to receive blade signals from the plurality of sensors; extract 2/rev loads from the blade signals; receive control signals for controlling the aircraft; adapt the received control signals based on the loads; and control the servo to adjust the blades to reduce a vibratory load on the blades.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
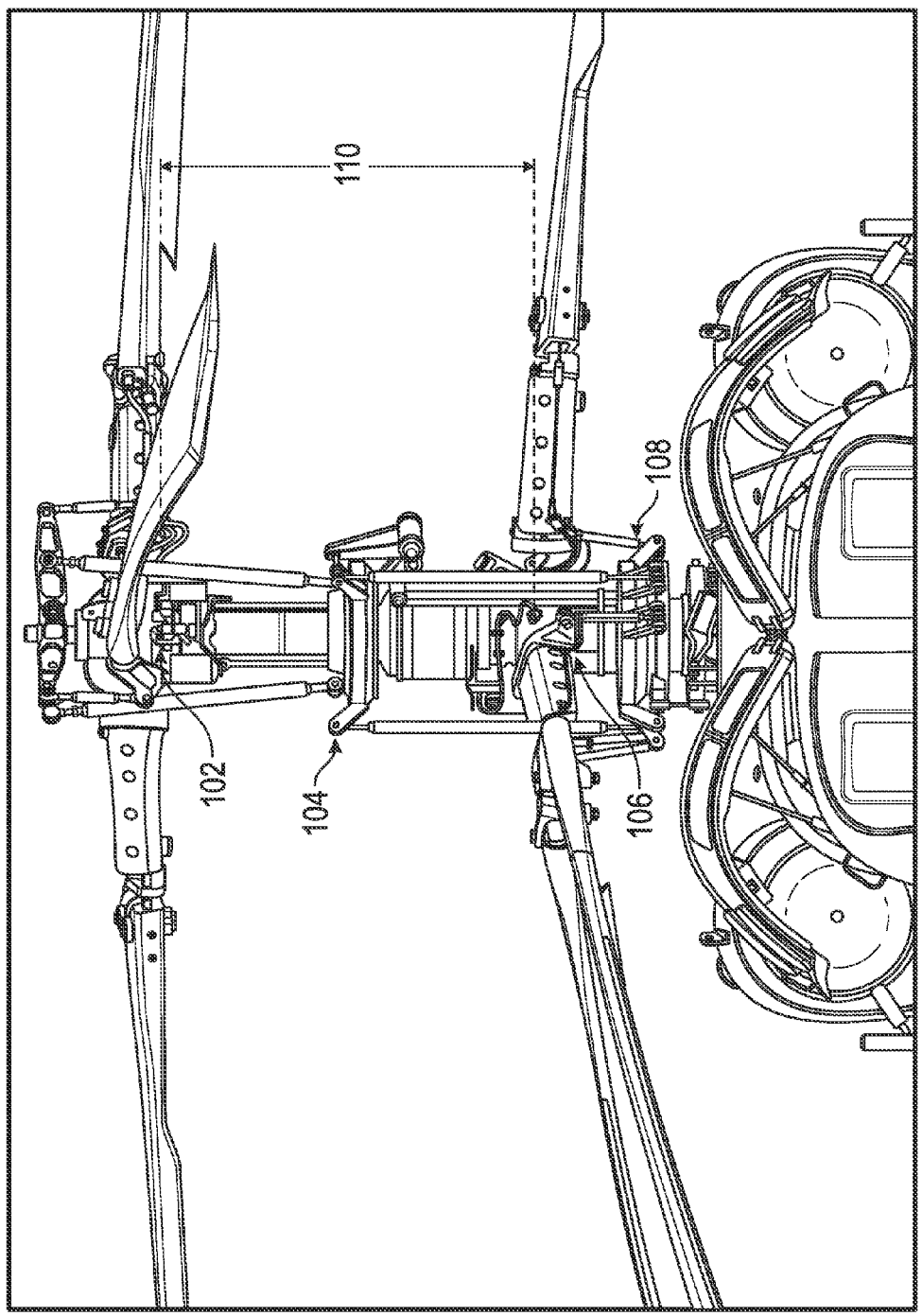
FIG. 1 illustrates a coaxial, dual rotor helicopter.
Figure 2A:
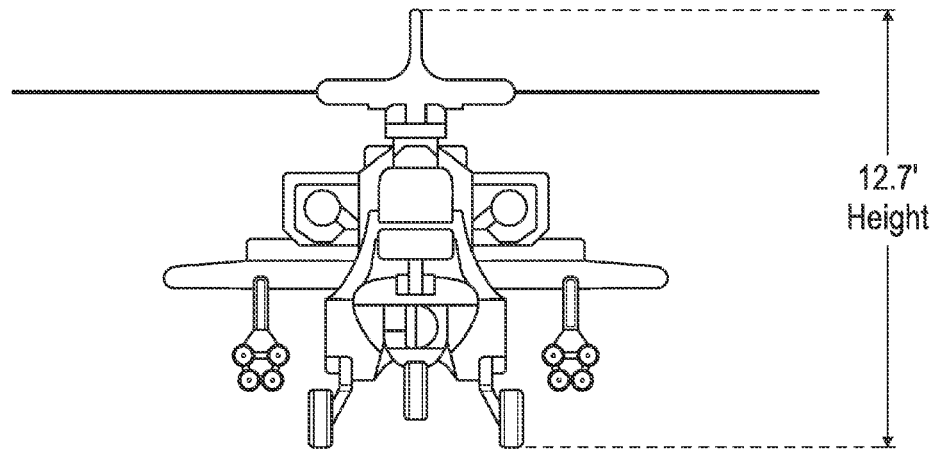
FIG. 2A illustrates a single axis/rotor helicopter.
Figure 2B:
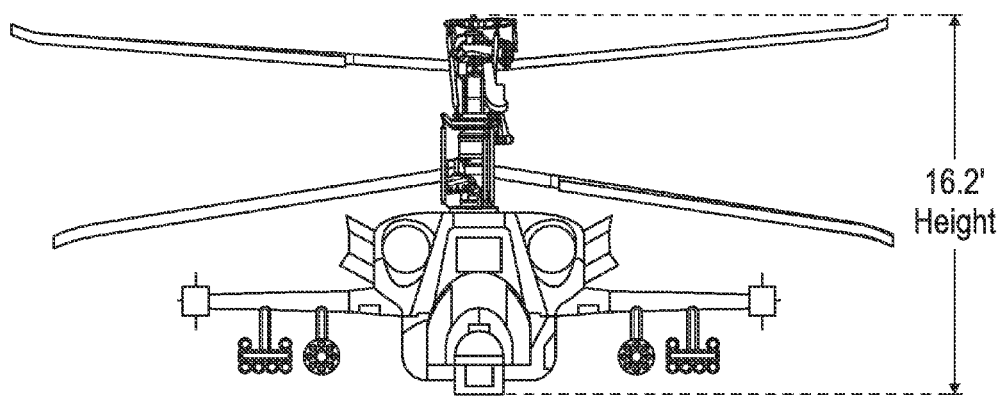
FIG. 2B illustrates a dual rotor helicopter.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for using 2/rev individual blade control (IBC) feedback to reduce 2/rev blade deflections and loads. In some embodiments, one or more blade sensors may detect 2/rev bending signals. The signals may be processed and actions may be taken to null or mitigate the impact of the 2/rev loads. In some embodiments, a controller may convert from commands for lateral, longitudinal, and/or collective blade cyclic pitch (A1s, B1s, Theta) to position commands for blade actuators using a sine and cosine calculation based on a sensed angular position of a rotor.

Figure 3:
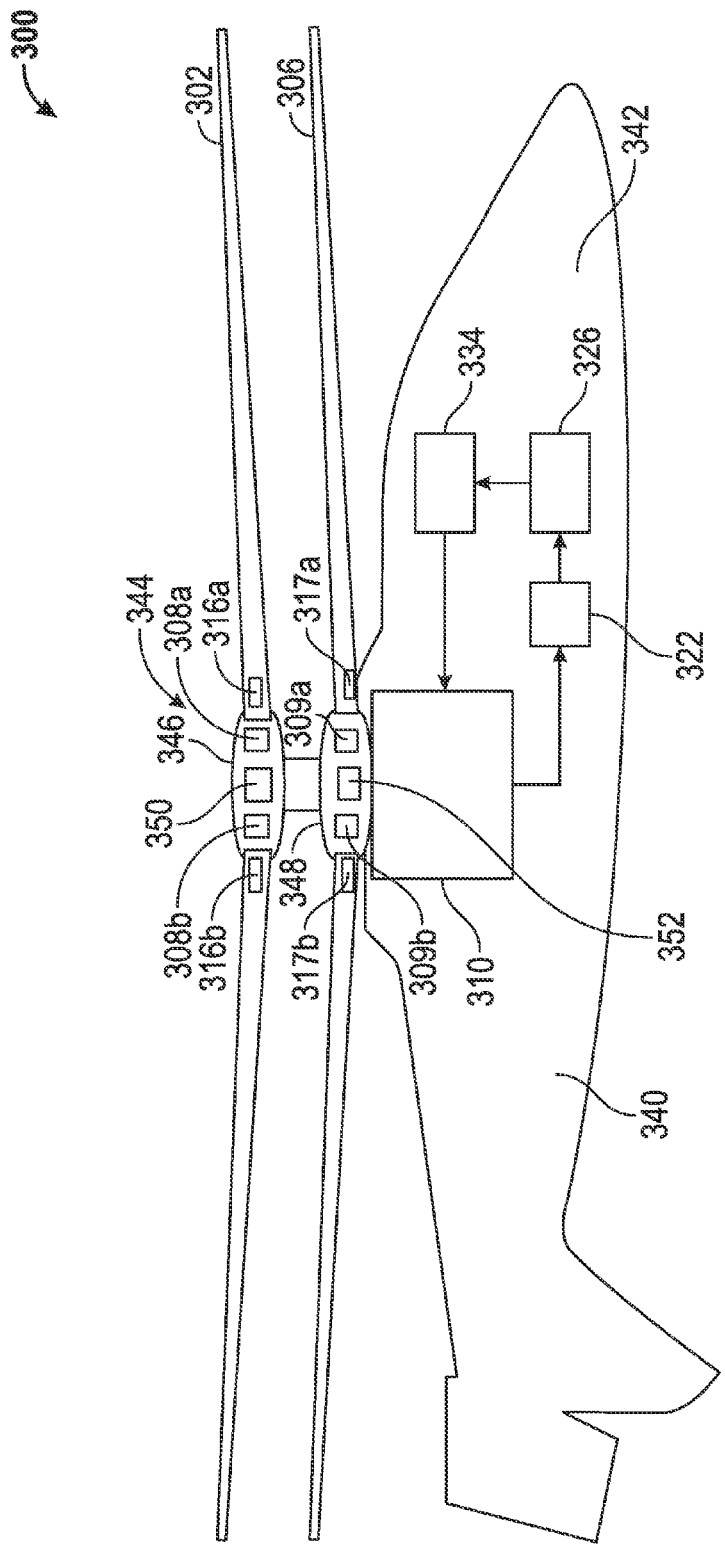
FIG. 3 illustrates a control system for a coaxial, dual-rotor helicopter according to an embodiment of the invention.

Referring to FIG. 3, a control environment or system 300 for a helicopter 340 is shown according to an embodiment of the invention. As illustrated, helicopter 340 includes a fuselage 342 and a rotor assembly 344. In an embodiment, the rotor assembly 344 includes an upper rotor assembly 346 and a lower rotor assembly 348 that are co-axial and rotate in an opposite direction to each other. The upper rotor assembly 346 may include upper rotor blades 302 while the lower rotor assembly 348 may include lower rotor blades 306. The upper and lower rotor blades 302, 306 may turn or rotate based on IBC servos or rotary actuators. Specifically, upper rotor blades 302 may be rotated by IBC servos 308a, 308b which receive control signals from an upper servo controller 350. Also, lower rotor blades 306 may be rotated by IBC servos 309a, 309b which receive control signals from a lower servo controller 352. The IBC servos 308a-308b, 309a-309b allow for precise control of, e.g., angular position, respective upper and lower rotor blades 302, 306 which may be facilitated by a transmission 310.

One or more strain gages or sensors 316a-316b and 317a-317b may be incorporated into the one or more blades. Particularly, sensors 316a-316b may be incorporated into upper rotor blades 302 and sensors 317a-317b may be incorporated into lower rotor blades 306. The sensors 316a-316b, 317a-317b may detect a rotor blade flatwise bending moment in the one or more of the blades 302, 306. The flatwise bending moment is converted to raw bending signals 322 which may be conveyed, potentially via the transmission 310 and using a slip ring (e.g., an optical slip ring), to a control computer 326.

The control computer 326 may analyze the raw bending signals 322 and extract the 2/rev sinusoidal components from the raw bending signals 322. Such extraction may be facilitated using a harmonic estimation algorithm, which may correspond to or be similar to a Fast Fourier Transform (FFT). The control computer 326 may generate and transmit servo control signals 334 to upper and lower servo controllers 350, 352, which may be transmitted to the respective IBC servos 308a-308b, 309a-309b via the transmission 310. The control computer 326 may transmit to the upper and lower rotor assemblies 346, 348 via the servo controllers 350, 351 2/rev sine and cosine signals, also known as phase and amplitude, which may be based on aircraft flight states (e.g., airspeed).

The servo control signals 334 may adjust 2/rev actuation signals to achieve a specified 2/rev blade bending load. While a zero-valued 2/rev blade bending load may be desirable from a blade fatigue load standpoint, applying varying loads to the upper and lower rotor assemblies 346 and 348 may be beneficial to tip clearance during one or more helicopter maneuvers. Optimization of rotor lift to drag ratio (L/D) may require different input from that needed for minimizing loads. A control system 300 may reduce 2/rev loads to zero, improve efficiency based on a pilot-selectable mode for level flight, and/or maintain tip clearance during maneuvers.

Figure 4:
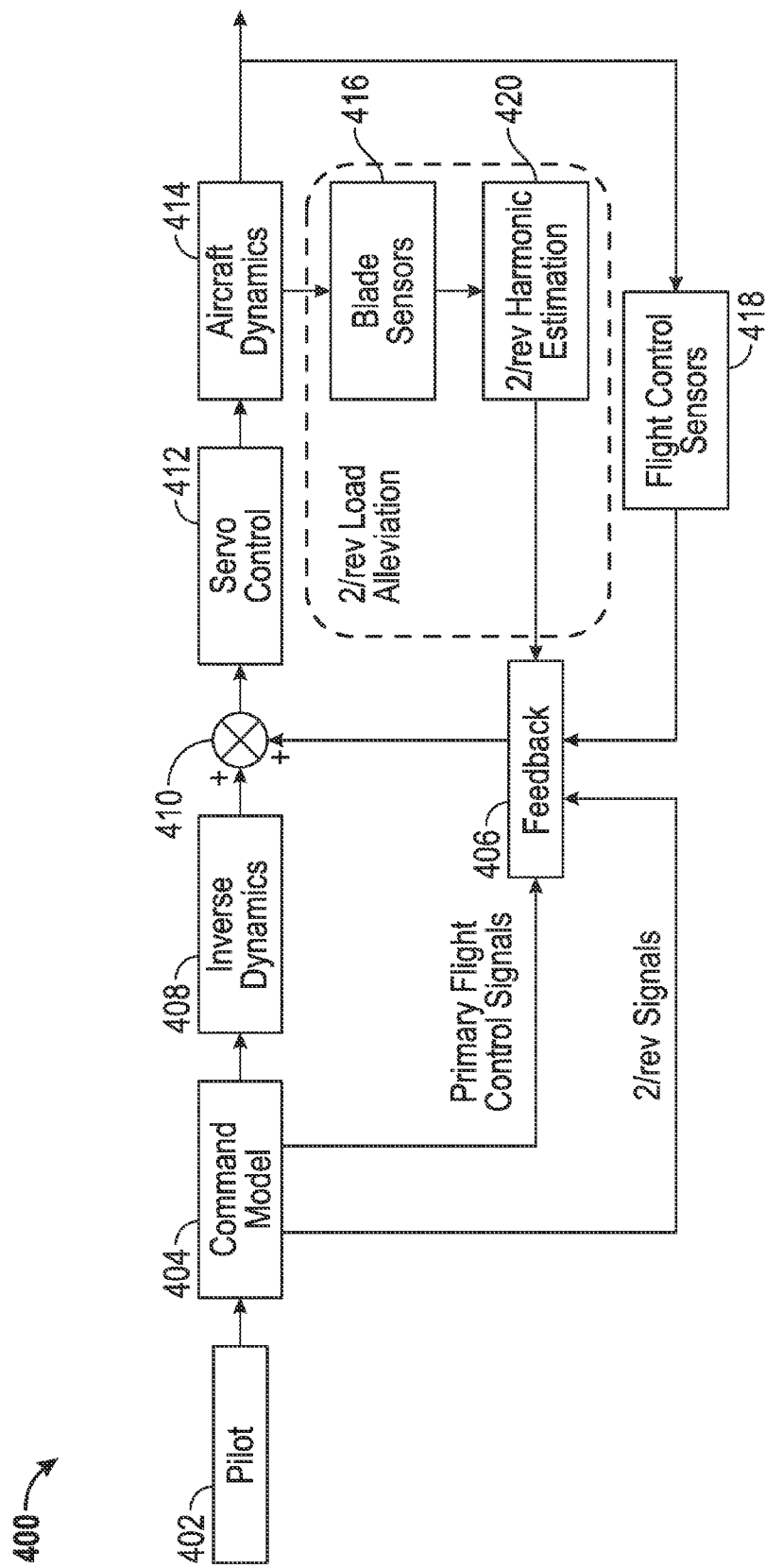
FIG. 4 illustrates a control algorithm and process flow according to an embodiment of the invention.

Referring to FIG. 4, a flow chart of architecture 400 is shown. The architecture 400 may be used to generate the servo control signals 334 of FIG. 3 for an aircraft. The architecture 400 may be implemented in connection with one or more devices or entities, such as the control computer 326 of FIG. 3.

A pilot 402 may issue one or more directives regarding the operation or flight of an aircraft (e.g., helicopter). The directives may be received by a command model 404. The command model 404 may estimate dynamics in a feed-forward fashion. For example, the command model 404 may generate an estimate of blade dynamics based on the pilot directives. The command model 404 may include models that may map inputs (e.g., pilot directives, flight measurements or parameters (e.g., airspeed, acceleration, attitude, etc.), etc.) to outputs (e.g., anticipated or estimated aircraft dynamic responses). The models may be established using simulations or wind tunnel data. The models may be refined based on system flight data. While described in terms of a pilot 402, it is understood that the pilot can be a human pilot, or could be an autonomous or semi-autonomous pilot using one or more processors, and/or could be separate from the aircraft as in the case of an unmanned aerial vehicle.

The command model 404 may generate (primary) flight control signals as well as 2/rev signals, which may be provided to a feedback block 406. The command model 404 may also provide input to an inverse dynamics block 408. The inverse dynamics block 408 may predict controls to implement desired aircraft dynamics. The command model 404 and the inverse plant 408 may function as follows: the pilot 402 makes a command with an inceptor (e.g. cyclic stick), the command model 404 converts that inceptor command to an aircraft dynamic command (e.g. pitch the nose down at X degrees per second), the inverse plant 408 ideally is the inverse of an aircraft dynamics block 414, so it takes the commanded dynamics and converts them to blade angle commands (e.g., input X deg/s pitch rate, output Y deg rotor cyclic blade pitch).

Outputs of the feedback block 406 and the inverse dynamics block 408 may be summed at a node 410. The output of the node 410 may drive a servo control block 412. The servo controls 412 may impact or drive the aircraft dynamic response 414, which may be monitored or detected by blade sensors 416 and flight control sensors 418. A 2/rev harmonic estimation block 420 may estimate 2/rev frequencies/vibrations based on the output of the blade sensors 416. Together, the blade sensors 416 and the 2/rev harmonic estimation block 420 may be used to provide 2/rev load alleviation. The flight control sensors 418 and the 2/rev harmonic estimation block 420 may provide input to the feedback block 406.

Figure 5:
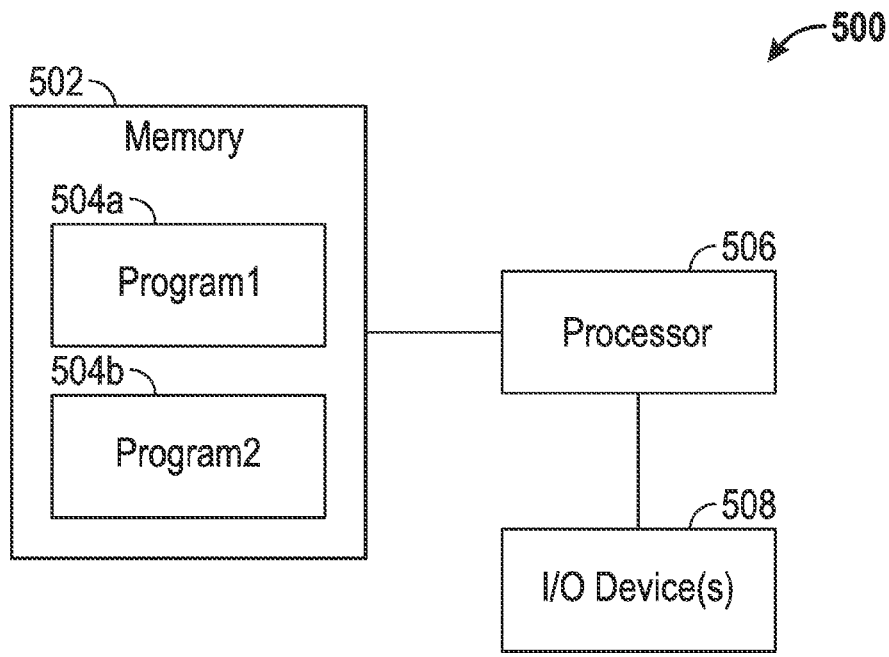
FIG. 5 is a schematic block diagram illustrating an exemplary computing system according to an embodiment of the invention.

Referring to FIG. 5, an exemplary computing system 500 is shown. The system 500 is shown as including a memory 502. The memory 502 may store executable instructions as well as models used in the method described in FIG. 6. The executable instructions may be stored or organized in any manner and at any level of abstraction, such as in connection with one or more applications, processes, routines, methods, etc. As an example, at least a portion of the instructions are shown in FIG. 5 as being associated with a first program 504a and a second program 504b.

The instructions stored in the memory 502 may be executed by one or more processors, such as a processor 506. The processor 506 may be coupled to one or more input/output (I/O) devices 508. In some embodiments, the I/O device(s) 508 may include one or more of a keyboard or keypad, a touchscreen or touch panel, a display screen, a microphone, a speaker, a mouse, a button, a remote control, a control stick, a joystick, a printer, etc. The I/O device(s) 508 may be configured to provide an interface to allow a user to interact with the system 500.

The system 500 is illustrative. In some embodiments, one or more of the entities may be optional. In some embodiments, additional entities not shown may be included. For example, in some embodiments the system 500 may be associated with one or more networks. In some embodiments, the entities may be arranged or organized in a manner different from what is shown in FIG. 5. One or more of the entities shown in FIG. 5 may be associated with one or more of the devices or entities described herein (e.g., the control computer 326 of FIG. 3).

Figure 6:
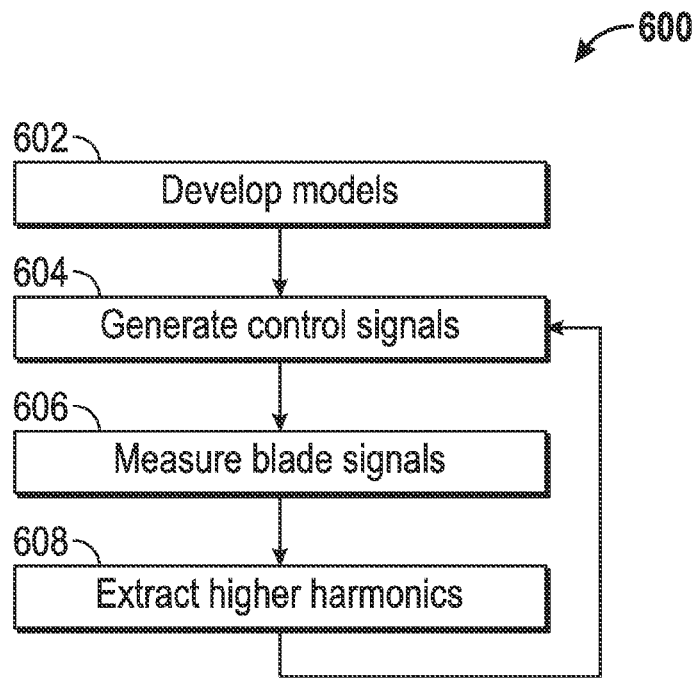
FIG. 6 is a flow chart of an exemplary method according to an embodiment of the invention.

Turning to FIG. 6, a flow chart of a method 600 is shown. The method 600 may be executed in connection with one or more components, devices, or systems, such as those described herein. The method 600 may be used to control blade bending (e.g., 2/rev blade bending) in various flight states for an aircraft, such as a coaxial helicopter configured with individual blade control on each rotor, and can also be used to develop models in advance of flight or during flight.

In block 602, one or more models may be developed. The models may be used to provide a prediction or estimate regarding one or more dynamic responses. For example, the models may be used to estimate blade dynamics or loads based on pilot inputs. Block 602 can be developed outside of the aircraft being flown, and therefore can be stored on the aircraft and recalled as needed in later operation. For instance, the models can be created using test data (such as wind tunnel data), or simulation data. As such, block 602 can be optional in aspects and can be performed separately from other blocks of the method of FIG. 6.

In block 604, one or more controls or control signals may be generated. The control signals may be generated based on the estimation models of block 602 in conjunction with input signals from, for example, a pilot. The control signals may serve to counteract the estimated dynamic responses/loads. The control signals may attempt to control higher harmonic (e.g., 2/rev) blade bending in different flight states.

In block 606, blade signals may be measured, potentially using one or more sensors.

In block 608, an estimation or extraction of higher harmonic loads from the measured blade signals of block 606 may be performed. Based on an identification of the higher harmonic loads in block 608, the control signals of block 604 may be adapted. For example, the control signals of block 604 may be adapted to minimize the higher harmonic loads by switching from one model to the next.

In some embodiments, one or more of the blocks or operations (or a portion thereof) of the method 600 may be optional. In some embodiments, the blocks may execute in an order or sequence different from what is shown in FIG. 6. In some embodiments, one or more additional blocks or operations not shown may be included.

Technical effects and benefits of aspects include, in aspects, a reduction in terms of the weight of components aboard an aircraft (e.g., a helicopter). For example, because 2/rev stresses may represent approximately 20% of the vibratory stress during level flight, 2/rev cyclic control can reduce the vibratory flatwise blade loads by approximately the same amount (20%), which may allow for a reduction in terms of a design weight of various rotor components (e.g., blades and hubs). 2/rev control may be used to improve the rotor L/D by approximately 5% relative to conventional aircraft configurations. 2/rev control may be used to improve tip clearance during maneuvers, allowing for a reduced rotor separation ratio and therefore a reduction in terms of total aircraft height. However, it is understood that aspects can have other advantages in addition to or instead of the above-noted advantages, benefits and effects.

Embodiments of the disclosure have been described in connection with aircraft/rotorcraft. Aspects of the disclosure may be applied in other environments or contexts. For example, aspects of the disclosure may be used to provide for a reduction of stress in turbine applications based on higher harmonic controls. Further, while described in the context of a specific example (2/rev), it is understood that aspects can be used in other per revolution harmonics. Additionally, while described in the context of a coaxial aircraft, it is understood that aspects can be used in single rotor aircraft, wind turbines, and other like bodies.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method of controlling an aircraft comprising an upper rotor including blades and a coaxial lower rotor including blades, the upper rotor and lower rotor being hingeless, rigid rotors, the method comprising:

receiving, by a computing device comprising a processor, at least one input associated with the aircraft;

generating, by the computing device, flight control signals based on the received at least one input;

detecting, by sensors incorporated into the blades of at least one of the upper or lower rotor, bending moments;

converting said bending moments into raw bending signals;

extracting, by the computing device, harmonic loads from the raw bending signals;

generate, by the computing device, servo control signals based on the harmonic loads and flight control signals; and controlling, by the computing device, servos connected to the blades to adjust the blades according to the servo control signals to reduce bending of the blades to improve blade tip clearance between blades on the upper rotor and blades on the lower rotor.

2. The method of claim 1, wherein the servo control signals are configured to reduce the harmonic loads.

3. The method of claim 1, wherein the servo control signals are configured to counteract 2/rev blade bending in a plurality of flight states.

4. The method of claim 1, wherein each of the blade signals is associated with an individual blade and wherein each of the servo control signals is associated with an individual blade.

5. The method of claim 1, wherein the at least one input comprises a pilot directive.

6. The method of claim 1, wherein the generated flight control signals are based on a model of the aircraft that maps the at least one input to the blade bending.

7. The method of claim 6, wherein the model is developed using wind tunnel simulation, and wherein the developed model is refined using flight data.

8. An apparatus for use in an aircraft having an upper rotor including blades and a coaxial lower rotor including blades, the upper rotor and lower rotor being hingeless, rigid rotors, the apparatus comprising:

at least one processor; and memory having instructions stored thereon that, when executed by the at least one processor, cause the apparatus to:

receive, with the at least one processor, at least one input associated with the aircraft;

generate, with the at least one processor, flight control signals based on the received at least one input;

detect, by sensors incorporated into the blades of at least one of the upper or lower rotor, bending moments;

convert said bending moments into raw bending signals;

extract, with the at least one processor, harmonic loads from the raw bending signals;

generate, by the computing device, servo control signals based on the harmonic loads and flight control signals; and control, with the at least one processor, servos connected to the blades to adjust the blades according to the servo control signals to reduce bending of the blades to improve blade tip clearance between blades on the upper rotor and blades on the lower rotor.

9. The apparatus of claim 8, wherein the servo control signals are configured to reduce the harmonic loads.

10. The apparatus of claim 8, wherein the servo control signals are configured to counteract 2/rev blade bending in a plurality of flight states associated with the aircraft.

11. The apparatus of claim 8, wherein each of the blade signals is associated with an individual blade and wherein each of the servo control signals is associated with an individual blade.

12. The apparatus of claim 8, wherein the at least one input comprises a pilot directive and flight parameters.

13. The apparatus of claim 8, wherein the flight control signals are based on the command model for the aircraft that maps the at least one input to the blade bending.

14. The apparatus of claim 13, wherein the command model is developed using wind tunnel simulation, and wherein the developed model is refined using flight data.

15. An aircraft comprising:

an upper and a coaxial lower rotor, each rotor comprising a plurality of blades, wherein each of the plurality of blades is associated with a sensor included in a plurality of sensors, the upper rotor and lower rotor being hingeless, rigid rotors;

a servo connected to at least one of the blades; and a control computer configured to:

receive at least one input associated with the aircraft;

generate flight control signals based on the received at least one input;

detect, by sensors incorporated into the blades of at least one of the upper or lower rotor, bending moments;

convert said bending moments into raw bending signals;

extract harmonic loads from the raw bending signals;

generate servo control signals based on the harmonic loads and flight control signals; and control servos connected to the blades to adjust the blades according to the servo control signals to reduce bending of the blades to improve blade tip clearance between blades on the upper rotor and blades on the lower rotor.

16. The aircraft of claim 15, wherein the flight control signals are based on a model of the aircraft.

17. The aircraft of claim 15, wherein the control computer is configured to adapt the servo control signals based on a tip clearance parameter during a maneuver.

18. The aircraft of claim 15, wherein the control computer is configured to adapt the servo control signals to obtain a specified lift to drag ratio.

* * * * *